United States Patent
Anker et al.

(10) Patent No.: US 8,501,844 B2
(45) Date of Patent: Aug. 6, 2013

(54) LOW MIGRATION POLYOLEFIN COMPOSITION COMPRISING VITAMIN E-TYPE STABILISER

(75) Inventors: Martin Anker, Hisings Kärra (SE); Svein Jamtvedt, Stathelle (NO); Jeroen Oderkerk, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 194 days.

(21) Appl. No.: 12/668,098

(22) PCT Filed: Jul. 8, 2008

(86) PCT No.: PCT/EP2008/005563
§ 371 (c)(1),
(2), (4) Date: May 19, 2010

(87) PCT Pub. No.: WO2009/010211
PCT Pub. Date: Jan. 22, 2009

(65) Prior Publication Data
US 2010/0266798 A1    Oct. 21, 2010

(30) Foreign Application Priority Data

Jul. 13, 2007 (EP) .................... 07013786

(51) Int. Cl.
| | |
|---|---|
| *C08K 5/15* | (2006.01) |
| *C08K 5/1545* | (2006.01) |
| *C08K 5/13* | (2006.01) |
| *B29C 47/00* | (2006.01) |
| *B29D 22/00* | (2006.01) |
| *B29D 23/00* | (2006.01) |
| *B32B 1/08* | (2006.01) |

(52) U.S. Cl.
USPC ............... 524/110; 524/342; 428/36.9

(58) Field of Classification Search
USPC ............... 524/110, 342; 428/36, 36.9
See application file for complete search history.

(56) References Cited

U.S. PATENT DOCUMENTS

| | | |
|---|---|---|
| 5,880,186 A | 3/1999 | Todesco et al. |
| 6,465,548 B1 | 10/2002 | Inoue et al. |
| 2005/0250889 A1 | 11/2005 | Malik et al. |
| 2006/0167146 A1 | 7/2006 | Rotzinger et al. |
| 2011/0257311 A1 * | 10/2011 | Anker et al. ............. 524/110 |

FOREIGN PATENT DOCUMENTS

| | | |
|---|---|---|
| EP | 124664 A1 * | 11/1984 |
| EP | 0 569 950 | 11/1993 |
| GB | 2 305 180 | 4/1997 |
| WO | 97/49758 | 12/1997 |
| WO | 2004/033545 | 4/2004 |
| WO | 2005/014706 | 2/2005 |
| WO | WO 2005056657 A2 * | 6/2005 |

* cited by examiner

*Primary Examiner* — Angela C Scott
(74) *Attorney, Agent, or Firm* — Roberts Mlotkowski Safran & Cole, P.C.

(57) ABSTRACT

The present invention relates to a polyolefin composition comprising (a) a polyolefin (A), (b) a vitamin E-type stabilizer (B) according to formula (I), wherein R1, R2, R3, R4 and R5 independently are H, or non-substituted or substituted aliphatic or aromatic hydrocarbyl radicals which may comprise heteroatoms, and (c) a phenolic stabilizer (C) according to formula (II), wherein R6, R7 and R8 independently are non-substituted or substituted aliphatic or aromatic hydrocarbyl radicals which may comprise OH-groups; and X1, X2, and X3 independently are H or OH, with the provisio that at least one of X1, X2 and X3 is OH, and (d) optionally, an UV stabilizer, to an article comprising such a polyolefin composition and to the use of such a composition for the production of an article.

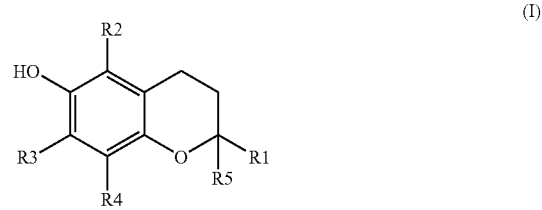

(I)

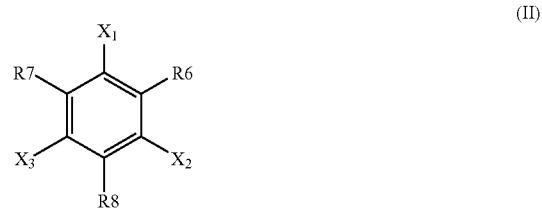

(II)

18 Claims, No Drawings

LOW MIGRATION POLYOLEFIN COMPOSITION COMPRISING VITAMIN E-TYPE STABILISER

The present invention relates to a polyolefin composition wherein the migration of the used additives and its decomposition products, especially phenols, out of the composition is low and thus the composition is particularly suitable for pipe applications, e.g. for drinking water.

Recent progress in the manufacturing and processing of polymers have led to the application of plastics in virtually every aspect of modern day life. However, polymeric compounds are prone to aging under the effects of light, oxygen and heat. This results in a loss of strength, stiffness and flexibility, discoloration and scratching as well as loss of gloss.

Polymeric compounds, for example polyolefins like polyethylene and polypropylene, undergo radical driven degradation processes especially during processing steps which might include moulding, extrusion, etc. However, degradation even proceeds during end-use by a radical mechanism under the influence of light or heat and will finally destroy the polymer properties.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Typically, modifiers are anti-static and anti-fogging agents, acid scavengers, blowing agents, lubricants, nucleating agents, slip and anti-blocking agents, as well as fillers, flame retardants and cross-linkers.

Stabilizers, like antioxidants, traditionally and currently used comprise sterically hindered phenolics, aromatic amines, organo-phosphites/phosphonites and thioethers. However, appropriate combinations of stabilizers have to be carefully selected, depending on the desired final properties the polymeric article should have.

In WO 2004/033545, antioxidant compositions are disclosed for improving long-term heat stability of polymeric materials.

Besides many other applications, polyolefins are used for the preparation of pipes for drinking water distribution systems. Due to the permanent contact to the inner pipe surface, compounds can migrate from the pipe material into the water. The admissible amounts of compounds within the drinking water are fixed by legal requirements and even stricter requirements are to be expected with the introduction of the so-called "European acceptance scheme".

Migration behavior of stabilizers and modifiers and/or decomposition products added to polyolefin-based materials is dependent from a number of different properties such as diffusion rate of the molecules within the polymer matrix, chemical stability of the additives, etc. Furthermore, it has to be taken into account that an improvement in migration behavior must not be obtained on the expense of stabilization of the polymer matrix. Thus, providing an additive composition of low migration tendency, is not straight-forward but rather needs a careful selection of appropriate compounds.

GB 2 305 180 discloses polyolefin compositions which are in permanent contact with an extracting media, these compositions further comprising organic phosphites/phosphonites, phenolic compounds or sterically hindered amines as stabilizing components.

However, considering stricter legal requirements to be expected in the near future, it is highly appreciated to provide pipes of high thermal and chemical stability and releasing only very small amounts of additives and/or decomposition products into the water.

Thus, it is an object of the present invention to provide a composition which has a low migration tendency of stabilisers and their decomposition pro-ducts, in particular of phenolic compounds, without losing the stabilisation effect of the stabilisers, in particular as regards stabilisation during processing and for obtaining the desired long-term properties.

The present invention is based on the finding that the object of the invention can be achieved, if the polymer composition comprises a specific combination of additives including a vitamin E-type stabiliser as defined below.

The invention therefore provides a polyolefin composition comprising
(a) a polyolefin (A),
(b) a vitamin E-type stabiliser (B) according to formula (I):

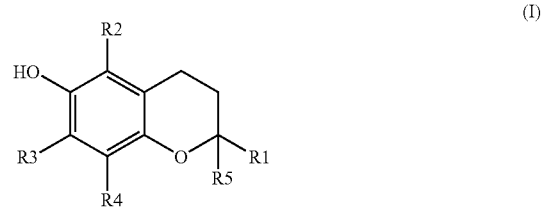

wherein R1, R2, R3, R4 and R5 independently are H, or non-substituted or substituted aliphatic or aromatic hydrocarbyl radicals which may comprise heteroatoms, and (c) a phenolic stabilizer (C) according to formula (II):

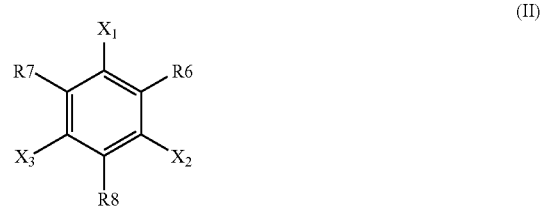

wherein R6, R7 and R8 independently are non-substituted or substituted aliphatic or aromatic hydrocarbyl radicals which may comprise OH-groups; and X1, X2, and X3 independently are H or OH, with the provisio that at least one of X1, X2 and X3 is OH, and,
(d) optionally, an UV stabilizer (D).

It has been found that the stabilized polyolefin compositions according to the invention show a reduced migration of phenolic compounds into water in contact with the composition compared to known, usual stabilized compositions. At the same time, a reduced total amount of stabilizers is needed to obtain the desired stabilization effects.

The heteroatoms which may be present in the non-substituted or substituted aliphatic or aromatic hydrocarbyl radicals R1, R2, R3, R4 and/or R5 of the vitamin E-type stabiliser (B) according to formula (I) may be oxygen, sulphur, nitrogen, phosphorus or the like. It is, however, preferred that R1, R2, R3, R4 or R5, more preferred R1, R2, R3, R4 and R5, do not comprise heteroatoms, i.e. are non-substituted or substituted aliphatic or aromatic hydrocarbyl radicals only, or, as mentioned, H.

Furthermore, preferably R2, R3, R4 or R5, more preferably R2, R3, R4 and R5, are H, or saturated aliphatic hydrocarbyl radicals comprising from 1 to 5 carbon atoms, and still more preferably R2, R3, R4 or R5, more preferably R2, R3, R4 and R5, are H, or methyl groups.

Furthermore, preferably R5 is a methyl group, regardless of the nature of the other residues R2 to R4.

In an especially preferred embodiment, R4 and R5 are methyl groups, and R2 and R3 are H, or methyl groups.

Most preferably, R2, R3, R4 and R5 are all methyl groups.

Still further, preferably R1 is a non-substituted or substituted aliphatic or aromatic hydrocarbyl radical containing from 5 to 50 carbon atoms, more preferably R1 is a non-substituted or substituted aliphatic hydrocarbyl radical containing from 5 to 50, more preferably from 10 to 30, carbon atoms, and most preferably R1 is a 4,8,12-trimethyl-tridecyl group.

Vitamin E-type stabiliser (B) is preferably contained in the composition in an amount of at most 0.5 wt %, more preferably of at most 0.2 wt %, still more preferably of at most 0.1 wt. %, and most preferably of at most 0.05 wt %, based on the total composition.

Furthermore, vitamin E-type stabiliser (B) is preferably contained in the composition in an amount of at least 0.005 wt %, more preferably of at least 0.01 wt. %, and most preferably of at least 0.015 wt %, based on the total composition.

In the phenolic stabilizer (C) according to formula (II) residues R6, R7 and R8 independently are non-substituted or substituted aliphatic or aromatic hydrocarbyl radicals which may comprise OH-groups. This means that apart from OH-groups no further heteroatoms are present in R6, R7 and R8, so that phenolic stabilizer (C) is e.g. free of ester groups, amide groups and groups containing phosphorus.

Preferably, R6, R7 and R8 which independently are non-substituted or substituted aliphatic or aromatic, more preferably aliphatic, hydrocarbyl radicals which may comprise OH-groups, have from 2 to 200 carbon atoms.

Preferably, R6 and R7 independently have from 2 to 20 carbon atoms, more preferably from 3 to 10 carbon atoms.

Furthermore, it is preferred that R6 and/or R7, more preferably R6 and R7, are aliphatic hydrocarbyl groups with at least 3 carbon atoms which have a branch at the second carbon atom, and most preferably R6 and/or R7, more preferably R6 and R7, are tert.butyl groups.

Preferably, R8 has from 20 to 100 carbon atoms, more preferably has from 30 to 70 carbon atoms.

Furthermore, it is preferred that R8 includes one or more phenyl residues.

Still further, it is preferred that R8 includes one or more hydroxyphenyl residues.

In the most preferred embodiment, R8 is a 2,4,6-tri-methyl-3,5-di-(3,5,-di-tert.butyl-4-hydroxyphenyl) benzene residue.

Preferably, in phenolic stabilizer (C) of formula (II) X1 is OH, and most preferably X1 is OH and X2 and X3 are H.

The amount of phenolic stabilizer (C) preferably is 0.02 wt % or more, more preferably 0.05 wt % or more, and most preferably 0.08 wt % or more.

The upper limit of the amount of phenolic stabilizer (C) preferably is equal to or less than 1 wt %, more preferably equal to or less than 0.5 wt %, and most preferably equal to or less than 0.3 wt %.

Preferably, the weight ratio between vitamin E-type stabiliser (B) and phenolic stabilizer (C) is from 1:20 to 1:1, more preferably is from 1:10 to 1:2, most preferably is from 1:6 to 1:2.

Furthermore, it is preferred that the total amount of stabilisers (B) and (C) in the composition is at most 1.5 wt. %, more preferably at most 1 wt. %, and most preferably at most 0.5 wt. %.

Preferably, the total amount of stabilisers (B) and (C) in the composition is at least 0.05 wt. %, more preferably at least 0.08 wt. %, and most preferably at least 0.1 wt. %.

Optionally, the composition according to the invention comprises an UV stabilizer (D). In a preferred embodiment of the invention UV stabilizer (D) is mandatorily present in the composition.

The UV-light stabilizer (D) preferably comprises, more preferably consists of a sterically hindered amine. Conventional sterically hindered amines working as UV-light stabilizer (frequently abbreviated as HALS: hindered amine light stabilizer) known in the art can be used, e.g. in WO 2005/014706 suitable sterically hindered amine are disclosed.

In the present invention it is preferred that the sterically hindered amine comprises one or more groups of the following formula:

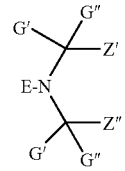

wherein G' and G" are the same or different alkyl residues, Z' and Z" are the same or different alkyl residues, or Z' and Z" together form a linking moiety which may additionally be substituted by an ester, ether, amide, amino, carboxy or urethane group, and E is oxyl, hydroxyl, alkoxy, cycloalkoxy, aryloxy or alkyl residue or hydrogen.

In a preferred embodiment, the sterically hindered amine is a polymer of 2,2,4,4-tetramethyl-7-oxa-3,20-diaza-dispiro-(5.1.11.2)-heneicosane-21-one and Epichlorohydrin The UV-light stabilizer is preferably used in an amount of 0.01 to 1 wt %, more preferred of 0.05 to 0.5 wt %, based on the total composition.

In another preferred embodiment the UV stabilizer (D) comprises, more preferably consists of, carbon black. In this embodiment, carbon black preferably is used in an amount from 0.2 to 3.5 wt %, more preferably from 1.0 to 3.5 wt %, and most preferably from 2.0 to 3.0 wt %, based on the total composition.

It is preferred that the composition of the invention is free of any (additional) phosphoros-containing stabilisers, and it is even more preferred that apart from stabilizers (B), (C) and, optionally, (D) no further stabilizers are present in the composition, i.e. that the only stabilisers present in the composition are stabilizers (B) and (C) and, optionally, (D) in any of the embodiments as described herein.

Furthermore, it is preferred that polyolefin (A) is an ethylene homo- or copolymer or a propylene homo- or copolymer. Most preferably, the polyolefin is an ethylene homo- or copolymer.

The polyolefin (A) can be obtained by any method known in the art.

Of course, when using the inventive composition, further compounds selected from conventional additives, acid scavengers, fillers, minerals and lubricants may be added for improving processability and surface characteristics thereof.

Preferably, the polyolefin composition of the invention has a total release of phenols at 200° C. and 5 min of at most 5 nanogram per milligram of the composition (ng/mg), more preferably of at most 3 ng/mg, and most preferably of at most 2 ng/mg, measured according to the total-release-of-phenols polymer analysis method as described in the examples section.

Furthermore, from the polyolefin composition of the invention an amount of at most 1 microgram of phenolic decomposition and/or by-products per liter of water (microg/liter) migrates into water, more preferably of at most 0.8 microg/liter, and most preferably of at most 0.5 microg/liter, measured according to the migration-into-water analysis method as described in the examples section.

The term "phenolic decomposition and/or by-products" denotes those phenolic compounds present in the composition, which either were formed by the decomposition of phenolic compounds which have been originally incorporated into the composition or which are phenolic by-products present in the phenolic compounds, as impurities, e.g. phenolic compounds with different structure to those intentionally added. As usually, and preferably, the only phenolic compounds incorporated into the composition are stabilizers, usually, and preferably, the only phenolic decomposition products present in the composition are originating from the stabilizers added.

The composition of the present invention is preferably used in pipes. This may be black as well as natural (i.e. non-colored) or colored pipes.

Preferably, such a pipe is used in a drinking water supply system. As it is shown below the use of the inventive composition in water pipes leads to a reduction of migration of additives and decomposition products thereof into water being in contact with said pipe.

It is furthermore preferred that the pipe is a cold water pipe, i.e. that it is designed for the transport of cold water.

EXAMPLES

1. Definitions and Measurement Methods a) Melt flow rate (MFR) of the polymer was measured according to ISO 1133 at a temperature of 190° C. The load is indicated as a subscript, i.e. $MFR_5$ is measured under a load of 5 kg.

b) Total-release-of-phenols polymer analysis

Pipe samples (in mg) were placed in an empty glass tube. The tube was heated to 200° C. during five minutes in Automated Thermal Desorption (ATD) device, the released organic substances were injected onto a gas chromatograph (GC) for separation, identified by mass spectrometry (MS) and quantified using flame ionization detector (FID).

Phenolic compounds were quantified using the same compounds as calibrant where possible. Other phenolic compounds found in the samples were quantified using structurally similar compounds.

c) Measurement of phenolic decomposition and/or by-products migration-into-water Pipe samples were leached with unchlorinated water according to EN-12873-1 at room temperature (23±2° C.). Water from the third migration period was analyzed for content of organic compounds. Water samples were extracted with methylene chloride. Isotopically labelled internal standards were added to the water before extraction. After concentration of the extracts, isotopically labelled injection standard was added, and the extracts were analyzed by gas chromatography with mass selective detector according to the draft CEN standard. "The GC-MS identification of water leachable organic substances from materials in contact with water intended for human consumption". This draft CEN Standard has been prepared by CEN TC 164 WG3 AHG7 based on the co-normative research project EVK1-CT 2000-00052 and work funded by DG Enterprise and Industry (Grant Agreement S12.403892).

As procedural blank, ultra pure water (Milli-Q) stored in acid washed glassware under the same time periods as leaching tests, was extracted with methylene chloride and all standards were added as described in the test method.

The ratio of the surface area (S) of the test piece intended to come into contact with test water to volume (V) of the test water shall be expressed per decimeter, i.e. $dm^{-1}$ (which is $dm^2/dm^3$ or $dm^2/liter$). Surface-to-volume (S/V) ratio should be in the range of 5 $dm^{-1}$ to 40 $dm^{-1}$. In the present invention the ratio S/V was 15.4 $dm^{-1}$.

The concentrations were then calculated according to $$[D]=AD/AI \times [I]$$

where

[D] is the concentration of a compounds D (in µg/liter);

AD is the peak area of compound D;

AI is the peak area of the internal standard;

[I] is the concentration of the internal standard (in µg/liter)

Phenolic compounds were quantified using the same compounds as calibrant where possible. Other phenolic compounds found in the samples were quantified using structurally similar compounds.

2. Samples Prepared and Measured

The compositions (Example 1 and 2) were compounded/melt homogenized in a Buss-Co-Kneader 100 MDK/E-11 L/D. Polymer and additives were fed into the first mixer inlet of the Buss Co-Kneader which is a single screw extruder with a downstream discharge single extruder with pelletizing unit cutting pellets in molten stage and cooled via water. The mixer temperature profile was 113/173/199/193/200° C. from first inlet to outlet, and discharge extruder temperature 166° C. The mixer screw rpm was 201 rpm and the throughput 200 kg/h. Pipes 32×3 mm (outer diameter×wall thickness) were prepared by extrusion in a Battenfeld 45-25B extruder, which gave an output of 33 kg/h at a screw speed of 39 rpm. The extruder melt temperature was 207° C.

The following compounds were used in the preparation of the compositions/pipes:

First stabilisers:

2,5,7,8-tetramethyl-2(4'8'12'-trimethyldecyl)chroman-6-ol (Irganox E 201™, vitamin E) commercially available from Ciba Speciality Chemical Tris(2,4-di-t-butylphenyl)phosphite (Irgafos 168™) commercially available from Ciba Speciality Chemical Phenolic Stabilisers:

Pentaerythrityl-terakis(3-(3',5'-di-tert.Butyl-4-hydroxyphenyl)-pro-pionate (Irganox 1010™) commercially available from Ciba Speciality Chemicals, 1,3,5-Tri-methyl-2-4,6-tris-(3,5-di-tert.butyl-4-hydroxy phenyl benzene (Ethanox 330™) commercially available from Albemarle Carbon black masterbatch:

The carbon black masterbatch (CBMB) contained 60.4 wt % HDPE, 39.5 wt % CB and 0.1 wt % Irganox 1010.

Base polymer:

Polyolefin (A) used as base polymer in all samples was an unstabilised bimodal high density polyethylene with a total butene comonomer content of 1.05 wt. % whereby the comonomer was present exclusively in the high molecular weight part of the polyethylene, an $MFR_5$ of 0.25 g/10 min, and a density of 948 kg/m³.

The following compositions have been prepared:

TABLE 1

| Compositions prepared, all data are given in wt. % | | |
| --- | --- | --- |
| | Example 1 (Comp.) | Example 2 |
| base polymer (A) | 93.88 | 93.96 |
| calcium stearate | 0.150 | 0.150 |
| carbon black MB | 5.75 | 5.75 |
| Irgafos 168 (B) | 0.11 | — |
| Irganox 1010 (C) | 0.11 | — |
| Ethanox 330 (D) | — | 0.11 |
| Vitamin E (E) | — | 0.03 |
| total amount stabilisers | 0.22 | 0.14 |

In Table 2, the results of both the polymer analysis as to total amount of phenols released at 200° C. and 5 min, and the measurement of phenolic decomposition and/or by-products migration-into-water are given.

From the results in Table 2 it can be seen that in the composition according to the invention a very much lower amount of phenols is contained in the composition itself, because less phenols are released in the above described test method. Furthermore, the migration of phenolic decomposition and/or by-products of the stabilizers used into water is drastically reduced.

TABLE 2

| | Example 1 (Comp.) | Example 2 |
| --- | --- | --- |
| Polymer analysis (total release of phenols in ng/mg composition) | 9.9 | 1.1 |
| Phenolic decomposition and/or by-products migration-into-water (total amount in microg/liter, (Surface/Volume ratio was 15.4 dm$^{-1}$)) | 1.2 (migrated decomposition and/or by-products from (B) and (C)) | 0.1 (migrated decomposition and/or by-products from (D) and (E)) |

The invention claimed is:

1. A pipe comprising a polyolefin composition comprising
    (a) an ethylene homo- or copolymer or a propylene homo or copolymer (A),
    (b) a vitamin E-type stabilizer (B) according to formula (I):

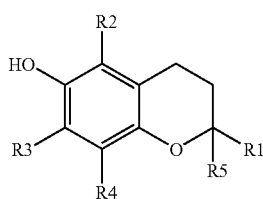

(I)

wherein R1, R2, R3, R4 and R5 independently are H, or nonsubstituted or substituted aliphatic or aromatic hydrocarbyl radicals which may comprise heteroatoms, and (c) a phenolic stabilizer (C) according to formula (II):

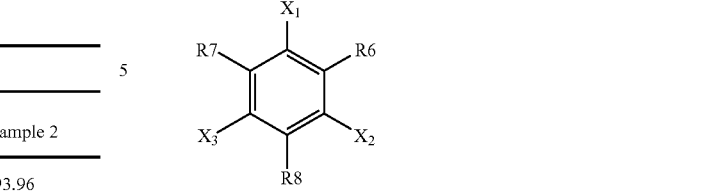

(II)

wherein R6, R7 and R8 independently are non-substituted or substituted aliphatic or aromatic hydrocarbyl radicals which may comprise OH-groups wherein apart from OH-groups no further heteroatoms are present in R6, R7 and R8; and X1, X2, and X3 independently are H or OH, with the proviso that at least one of X1, X2 and X3 is OH, and,
    (d) optionally, an UV stabilizer (D) consisting of a sterically hindered amine or carbon black,
    wherein no stabilizers other than (B), (C) and optionally (D) are present in the composition.

2. The pipe according to claim 1 wherein in vitamin E-type stabilizer of formula (I) R2, R3, R4 and R5 independently are H, or saturated aliphatic hydrocarbyl radicals comprising from 1 to 5 carbon atoms.

3. The pipe according to claim 1 wherein in vitamin E-type stabilizer of formula (I) R1 is a nonsubstituted or substituted aliphatic hydrocarbyl radical containing from 5 to 50 carbon atoms.

4. The pipe according to claim 1 wherein vitamin E-type stabiliser (B) is contained in the polyolefin composition in an amount of at most 0.5 wt %.

5. The pipe according to claim 1 wherein vitamin E-type stabiliser (B) is contained in the polyolefin composition in an amount of at least 0.005 wt. %.

6. The pipe according to claim 1 wherein in phenolic stabilizer (C) of formula (II) R6, R7 and R8 independently are non-substituted or substituted aliphatic hydrocarbyl radicals which may comprise OH-groups wherein apart from OH-groups no further heteroatoms are present in R6, R7 and R8, and have from 2 to 200 carbon atoms.

7. The pipe according to claim 1 wherein in phenolic stabilizer (C) of formula (II) R6 and R7 are aliphatic hydrocarbyl groups with at least 3 carbon atoms which have a branch at the second carbon atom.

8. The pipe according to claim 1 wherein in phenolic stabilizer (C) of formula (II) R8 has from 20 to 100 carbon atoms.

9. The pipe according to claim 1 wherein in phenolic stabilizer (C) of formula (II) R8 includes one or more hydroxy phenyl residues.

10. The pipe according to claim 1 wherein in the polyolefin composition the amount of phenolic stabilizer (C) is 0.02 wt % or more.

11. The pipe according to claim 1 wherein in the polyolefin composition the amount of phenolic stabilizer (C) is 1 wt % or less.

12. The pipe according to claim 1 wherein in the polyolefin composition the weight ratio between vitamin E-type stabiliser (B) and phenolic stabilizer (C) is from 1:20 to 1:1.

13. The pipe according to claim 1 wherein the total amount of stabilisers (B) and (C) in the polyolefin composition is at most 1.5 wt. %.

14. The pipe according to claim 1 wherein in the polyolefin composition the total amount of stabilisers (B) and (C) in the composition is at least 0.05 wt. %.

15. The pipe according to claim 1 wherein in the polyolefin composition UV stabilizer (D) is mandatorily present.

16. The pipe according to claim 1 wherein polyolefin (A) is an ethylene homo- or copolymer.

17. The pipe according to claim 1 wherein the composition has a total release of phenols at 200° C. and 5 min of at most 5 nanogram per milligram of the composition (ng/mg), measured according to the total-release-of-phenols polymer analysis method.

18. The pipe according to claim 1 wherein from the composition an amount of at most 1 microgram of phenolic decomposition and/or by-products per liter of water (μg/liter) migrates into water, measured according to the migration-into-water analysis method.

* * * * *